(12) United States Patent
Nomoto

(10) Patent No.: US 10,050,437 B2
(45) Date of Patent: Aug. 14, 2018

(54) POWER SUPPLY APPARATUS AND POWER SUPPLY METHOD

(75) Inventor: Shinichi Nomoto, Tokyo (JP)

(73) Assignees: FURUKAWA ELECTRIC CO., LTD., Tokyo (JP); FURUKAWA AUTOMOTIVE SYSTEMS INC., Shiga (JP)

(*) Notice: Subject to any disclaimer, the term of this patent is extended or adjusted under 35 U.S.C. 154(b) by 1161 days.

(21) Appl. No.: 14/342,369

(22) PCT Filed: Jun. 21, 2012

(86) PCT No.: PCT/JP2012/065898
§ 371 (c)(1),
(2), (4) Date: Apr. 27, 2014

(87) PCT Pub. No.: WO2013/002120
PCT Pub. Date: Jan. 3, 2013

(65) Prior Publication Data
US 2014/0225443 A1    Aug. 14, 2014

(30) Foreign Application Priority Data
Jun. 30, 2011  (JP) .................................. 2011-145149

(51) Int. Cl.
*H02J 1/00* (2006.01)
*H01M 10/44* (2006.01)
(Continued)

(52) U.S. Cl.
CPC .................. *H02J 1/00* (2013.01); *B60L 1/00* (2013.01); *B60L 11/1855* (2013.01);
(Continued)

(58) Field of Classification Search
CPC ... H02J 1/00; H02J 7/0016; H02J 7/34; B60L 1/00
(Continued)

(56) References Cited

U.S. PATENT DOCUMENTS 5,461,264 A    10/1995  Yang
5,898,291 A *  4/1999  Hall ...................... H02J 7/0026
                                                320/118
(Continued)

FOREIGN PATENT DOCUMENTS

DE    19911593 A1    9/2000
EP     2006973 A1   12/2008
(Continued)

OTHER PUBLICATIONS

U.S. Appl. No. 14/173,771; Non-Final Office Action; dated Oct. 22, 2015; 6 pages.
(Continued)

*Primary Examiner* — Alfonso Perez Borroto
(74) *Attorney, Agent, or Firm* — Baker & Hostetler LLP

(57) ABSTRACT

A power supply apparatus is provided that has a plurality of secondary batteries connected in series, outputs a composite voltage of all of the secondary batteries, and outputs an output of a part of the secondary batteries as a partial voltage. The power supply apparatus includes a detecting unit that detects states of the secondary batteries, a changing unit that changes an order of series connection of the plurality of secondary batteries based on a detection result of the detecting unit in such a manner that the partial voltage is outputted from a secondary battery that is in a relatively good state.

13 Claims, 9 Drawing Sheets

(51) Int. Cl.
*H01M 10/48* (2006.01)
*H02J 7/00* (2006.01)
*H02J 7/34* (2006.01)
*B60L 1/00* (2006.01)
*B60L 11/18* (2006.01)

(52) U.S. Cl.
CPC ....... *B60L 11/1866* (2013.01); *H01M 10/441* (2013.01); *H01M 10/482* (2013.01); *H02J 7/0016* (2013.01); *H02J 7/0024* (2013.01); *H02J 7/0054* (2013.01); *H02J 7/0063* (2013.01); *H02J 7/34* (2013.01); *B60L 2240/547* (2013.01); *Y02T 10/7005* (2013.01); *Y02T 10/7061* (2013.01); *Y10T 307/685* (2015.04)

(58) Field of Classification Search
USPC .......................................................... 307/77
See application file for complete search history.

(56) References Cited

U.S. PATENT DOCUMENTS

| | | | |
|---|---|---|---|
| 5,939,861 A | 8/1999 | Joko et al. | |
| 6,430,692 B1* | 8/2002 | Kimble | G06F 1/263 |
| | | | 307/66 |
| 7,443,199 B2 | 10/2008 | Dias et al. | |
| 2005/0212493 A1 | 9/2005 | Yamaguchi et al. | |
| 2009/0123829 A1* | 5/2009 | Kim | H01M 2/1022 |
| | | | 429/150 |

FOREIGN PATENT DOCUMENTS

| | | |
|---|---|---|
| JP | S59-127537 A | 7/1984 |
| JP | H03-056040 A | 3/1991 |
| JP | 10-14002 | 1/1998 |
| JP | 11-234909 | 8/1999 |
| JP | 2000-060019 | 2/2000 |
| JP | 2003-098239 A | 4/2003 |
| JP | 2007-053838 | 3/2007 |
| JP | 3938250 | 4/2007 |
| JP | 2007-267454 | 10/2007 |
| JP | 2010-093980 | 4/2010 |

OTHER PUBLICATIONS

China Patent Application No. 201280019914.1; Office Action; dated Jun. 17, 2015; 20 pages.
European Patent Application No. 12804063.1; Extended Search Report; dated Sep. 29, 2014; 6 pages.
Japan Patent Application No. 2013-522804; Decision to Grant; dated Aug. 1, 2016; 6 pages.
International Application No. PCT/JP2012/065898: International Search Report dated Sep. 18, 2012, 3 pages.

* cited by examiner

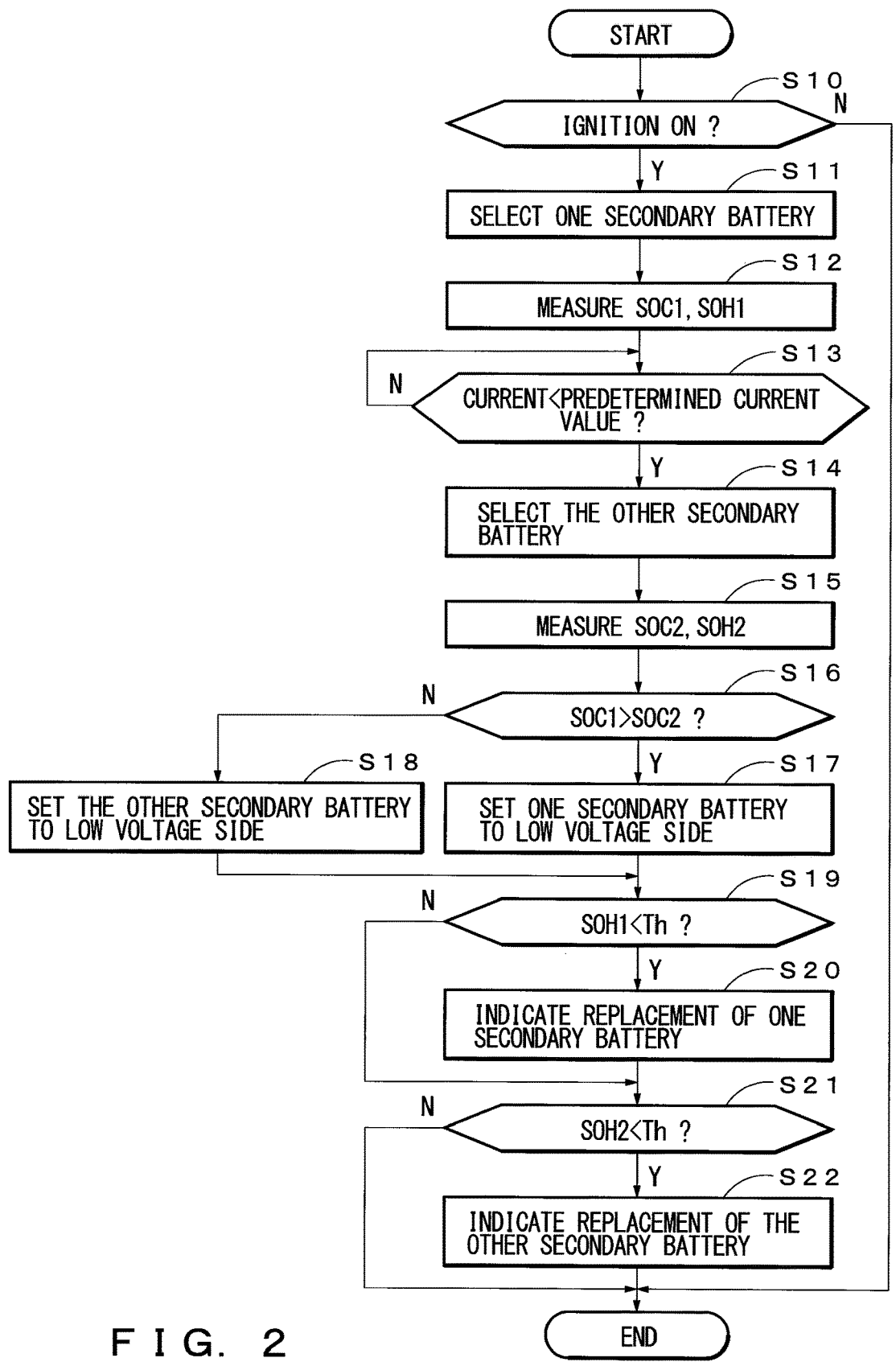
F I G. 2

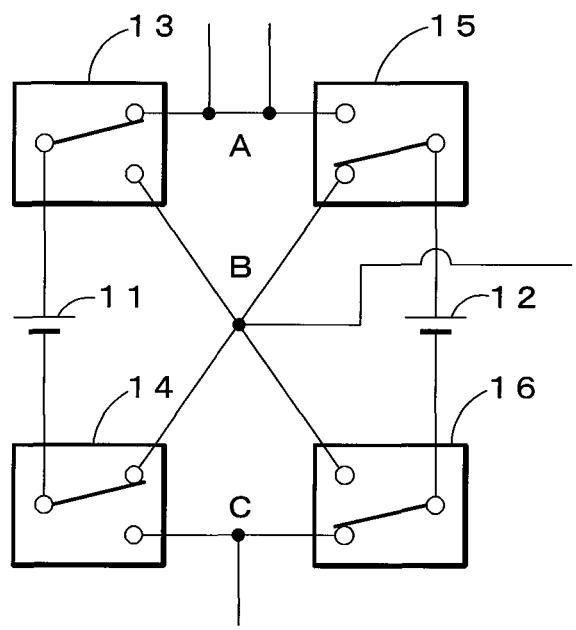
F I G. 3A
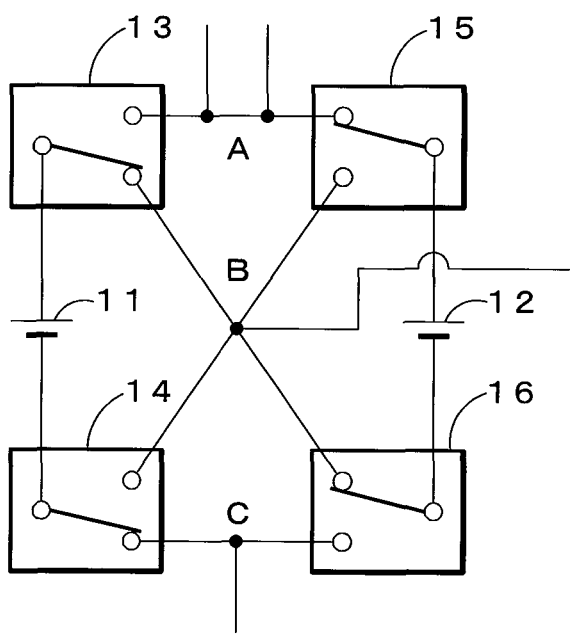
F I G. 3B

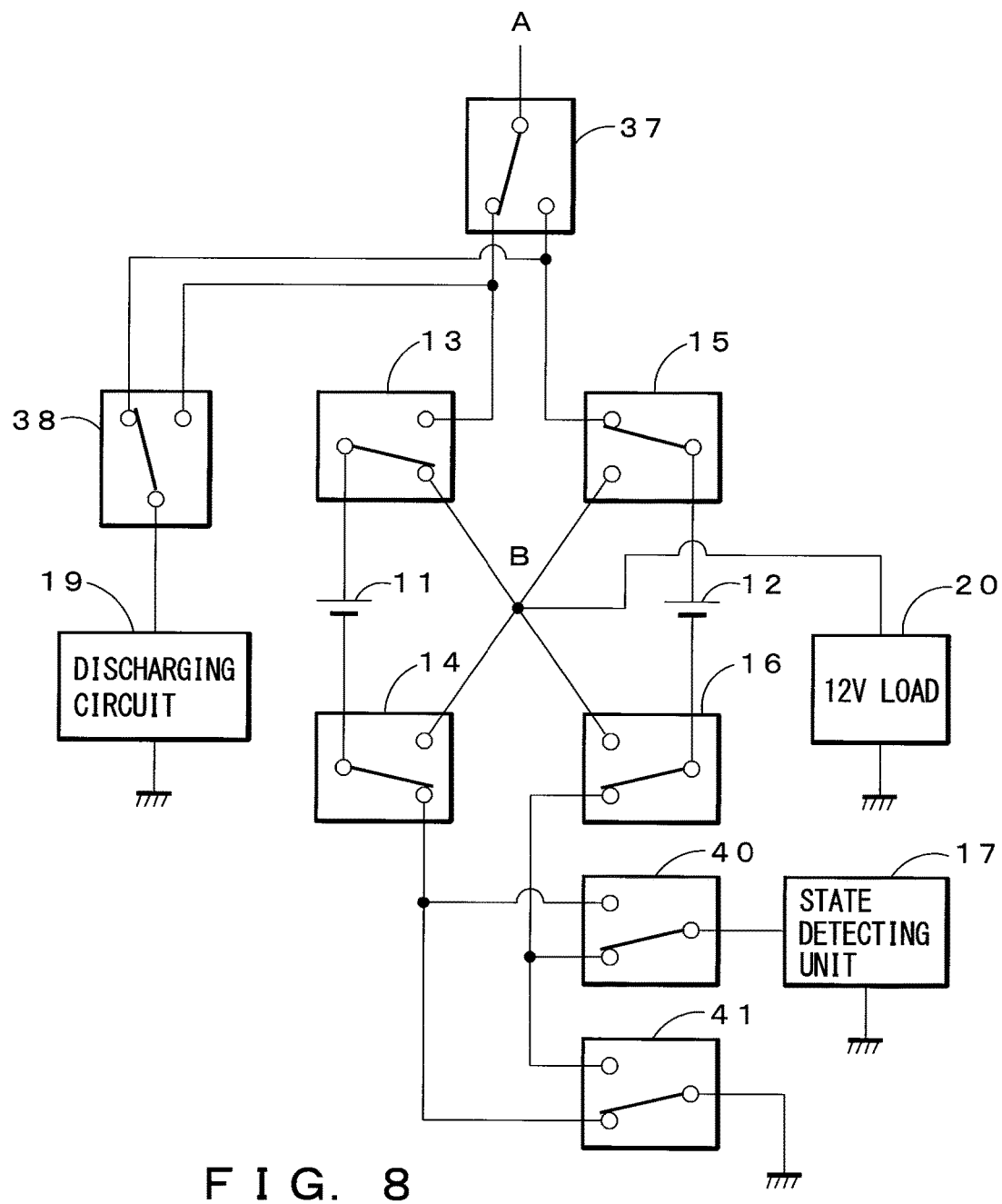
F I G. 8

POWER SUPPLY APPARATUS AND POWER SUPPLY METHOD

CROSS-REFERENCE TO RELATED APPLICATIONS

This application is the National Stage of International Application No. PCT/JP2012/065898, filed Jun. 21, 2012, which claims the benefit of Japanese Patent Application number 2011-145149, filed Jun. 30, 2011, the disclosures of which are incorporated herein by reference in their entirety.

BACKGROUND

Technical Field

The present disclosure relates to a power supply apparatus and a power supply method.

Background Art

There are many large-sized vehicles such as trucks or buses that have two power supplies a 24V-power supply that mainly drives a starter motor and a 12V-power supply that drives in-vehicle accessories. As a method of supplying power from the two power supplies, it is common to connect 12V-secondary batteries in series, and to obtain 24V as their total voltage and obtain 12V from one of the secondary batteries.

As has been described above, when the two secondary batteries are connected in series in the aforementioned manner, there may be a case in which the discharging of a secondary battery on a 12V-side progresses faster as compared to the other secondary battery, and a difference in the charging rate may occur between the two secondary batteries. In such a case, the life of one of the secondary batteries may shorten, or as the discharging progresses, it may not be able to drive the starter motor.

Accordingly, in order to prevent such a situation, in the related art, there are a technique of connecting a resistance element to a secondary battery on a high-voltage side and discharging electricity to balance them (Japanese Laid-Open Patent Publication No. 2007-267454), a technique of transferring an electric power from a secondary battery of a high voltage to a secondary battery of a low voltage using a convertor or a transformer (Japanese Laid-Open Patent Publication Nos. 2010-93980 and 2000-60019), and a technique of equalizing a charged state by bypassing a secondary battery that has come to a full-charge state during the charging (Japanese Laid-Open Patent Publication No. 1998-14002).

According to the technique described in Japanese Laid-Open Patent Publication No. 2007-267454, since an electric power is converted into heat by a resistor, there is a disadvantage that efficiency is low due to an occurrence of a loss of an electric power. According to the technique described in Japanese Laid-Open Patent Publication No. 2010-93980, since an electric power is transferred between the secondary batteries, there is a disadvantage that time is required for the transfer. According to the technique described in Japanese Laid-Open Patent Publication No. 2000-60019, since an electric power is transferred using a transformer, there is a disadvantage that the transfer is not appropriately performed due to a winding ratio of the coil and that time is required for the transfer. Further, according to the technique described in Japanese Laid-Open Patent Publication No. 1998-14002, since it is a technique of managing the charging, there is a disadvantage that the discharging cannot be managed.

SUMMARY

Accordingly, it is an object of the present disclosure to provide a power supply apparatus and a power supply method that can perform charge/discharge management of a plurality of secondary batteries efficiently in a short time.

In order to achieve the above object, a power supply apparatus that has a plurality of secondary batteries connected in series, outputs a composite voltage of all of the secondary batteries, and outputs an output of a part of the secondary batteries as a partial voltage is provided that includes a detecting unit that detects states of the secondary batteries, and a changing unit that changes an order of series connection of the plurality of secondary batteries based on a detection result of the detecting unit in such a manner that the partial voltage is outputted from a secondary battery that is in a relatively good state.

With such a structure, discharge/charge management of a plurality of secondary batteries can be performed efficiently in a short time. Further, by changing an order of series connection of the plurality of secondary batteries in such a manner that the partial voltage is outputted from a secondary battery that is in a relatively good state, the load can be prevented from being concentrated on one of the secondary batteries, and thus the life of the battery can be lengthened.

According to another configuration, in addition to the aforementioned configuration, the power supply apparatus has two secondary batteries, the power supply apparatus outputs a composite voltage of terminal voltages of the two secondary batteries and a terminal voltage of a secondary battery connected to a ground side as a partial voltage, the detecting unit detects states of the two secondary batteries, and the changing unit changes an order of the series connection in such a manner that a secondary battery that is in a relatively good state, which has been detected by the detecting unit, is connected to a ground side.

According to such a configuration, charge/discharge management of two secondary batteries can be performed efficiently in a short time.

According to another configuration, in addition to the aforementioned configuration, the changing unit has four switches each having a single common terminal, a first selective terminal and a second selective terminal, a positive pole and a negative pole of each of the two secondary batteries are connected to the respective common terminals of the four switches, respective first selective terminals of the four switches are connected with one another, the respective first selective terminals being a terminal that outputs the partial voltage, respective second selective terminals of two switches connected to the positive pole through the respective common terminals are connected with each other, the respective second selective terminals being a terminal that outputs the composite voltage, respective second selective terminals of the two switches connected to the negative pole through the respective common terminals are connected with each other, the respective second selective terminals being a terminal that is connected to a ground, and the order of series connection is changed by controlling a connecting state of the four switches.

According to such configuration, charge/discharge management of two secondary batteries can be performed efficiently with a simple configuration.

According to another configuration, in addition to the aforementioned configuration, the detecting unit is connected between a terminal connected to the ground and the ground.

With such a configuration, by positively detecting a current flowing to the two secondary batteries, the states of the secondary batteries can be detected accurately.

According to another configuration, in addition to the aforementioned configuration, a discharge unit that makes the secondary battery discharge when detecting the states of the secondary batteries is connected between the terminal that outputs the partial voltage and the ground.

With such a configuration, by causing the secondary battery to discharge and by detecting the voltage and current during the discharge, the states of the secondary batteries can be detected accurately.

According to another configuration, in addition to the aforementioned configuration, the two secondary batteries are connected in parallel by the four switches and the partial voltage is supplied to a load.

With such a configuration, when outputting a partial voltage, an unbalance in the states can be prevented by connecting the secondary batteries in parallel.

According to another configuration, in addition to the aforementioned configuration, in detecting the states of the secondary battery by the detecting unit, the state of one of the secondary batteries is detected by the detecting unit and a terminal voltage of the other secondary battery is supplied to the load as a partial voltage.

With such configuration, since the states of the secondary batteries can be detected while an electric current is not flowing to the load, the states of the secondary batteries can be detected even more accurately.

According to another configuration, in addition to the aforementioned configuration, the power supply apparatus has three secondary batteries, the power supply apparatus outputs a composite voltage of terminal voltages of the three secondary batteries and a terminal voltage of one of the secondary batteries connected to a ground side as a partial voltage, the detecting unit detects the states of the three secondary batteries, and the changing unit changes an order of series connection in such a manner that a secondary battery having a relatively good state, which has been detected by the detecting unit, is connected to a ground side.

According to such a configuration, charge/discharge management of the three secondary batteries can be performed efficiently in a short time.

According to another configuration, in addition to the aforementioned configuration, the power supply apparatus has four secondary batteries, the power supply apparatus outputs a composite voltage of terminal voltages of the four secondary batteries and outputs a terminal voltage of one or two of the secondary batteries, which is connected to the ground side, as a partial voltage, the detecting unit detects the states of the four secondary batteries, and the changing unit changes an order of the series connection in such a manner that a secondary battery having a relatively good state, which has been detected by the detecting unit, is connected to a ground side.

With such a configuration, charge/discharge management of the four secondary batteries can be performed efficiently in a short time.

According to another configuration, in addition to the aforementioned configuration, in the power supply apparatus, a single detecting unit that detects the states of the secondary batteries is provided.

With such a configuration, the states of a plurality of secondary batteries can be detected with a single state detecting unit by changing an order of series connection of the plurality of secondary batteries. Thereby, since a detecting unit need not be arranged for each individual secondary battery, the cost of the apparatus as a whole can be reduced.

According to another configuration, in addition to the aforementioned configuration, a power supplying method that has a plurality of secondary batteries connected in series, outputs a composite voltage of all of the secondary batteries, and outputs an output of a part of the secondary batteries as a partial voltage is provided that includes detecting states of the secondary batteries, and changing an order of series connection of the plurality of secondary batteries in such a manner that the partial voltage is outputted from a secondary battery in a relatively good state, based on a detection result of the detecting unit.

With such a method, charge/discharge management of a plurality of secondary batteries can be performed efficiently in a short time. Also, by changing an order of series connection of the plurality of secondary batteries in such a manner that the partial voltage is outputted from a secondary battery in a relatively good state, the load can be prevented from being concentrated on a single secondary battery, and thus the life of the battery can be lengthened.

Further, according to another configuration, in addition to the aforementioned configuration, in the power supplying method, a changing switch is switched only when a current detected in the detecting is less than or equal to a predetermined current.

With such a method, it is possible to prevent deterioration of contacts of a switch due to the switching during a large current flow having a current value greater than or equal to a predetermined current value.

According to the present disclosure, a power supply apparatus and a power supply method that can perform a discharge and charge management of a plurality of secondary batteries efficiently in a short time can be provided.

Further, according to the present disclosure, by changing an order of series connection of the plurality of secondary batteries in such a manner that the partial voltage is outputted from a secondary battery that is in a relatively good state, the load can be prevented from being concentrated on one of the secondary batteries, and thus the life of the battery can be lengthened.

Further, the states of a plurality of secondary batteries can be detected by a single state detecting unit by changing the order of series connection of the plurality of secondary batteries. Thereby, since a detecting unit need not be provided for each individual secondary battery, the cost of the entire apparatus can be reduced.

BRIEF DESCRIPTION OF DRAWINGS

FIG. 2 is a flow chart for explaining a process flow executed in the embodiment shown in FIG. 1.

FIGS. 3A and 3B are diagrams showing a change in a connected state in the embodiment shown in FIG. 1.

FIG. 8 is a diagram for explaining yet another embodiment of the present disclosure.

DETAILED DESCRIPTION

Further features of the present disclosure will become apparent from the following detailed description of exemplary embodiments with reference to the accompanying drawings.

(A) Description of a Configuration of the Embodiment

Figure 1:
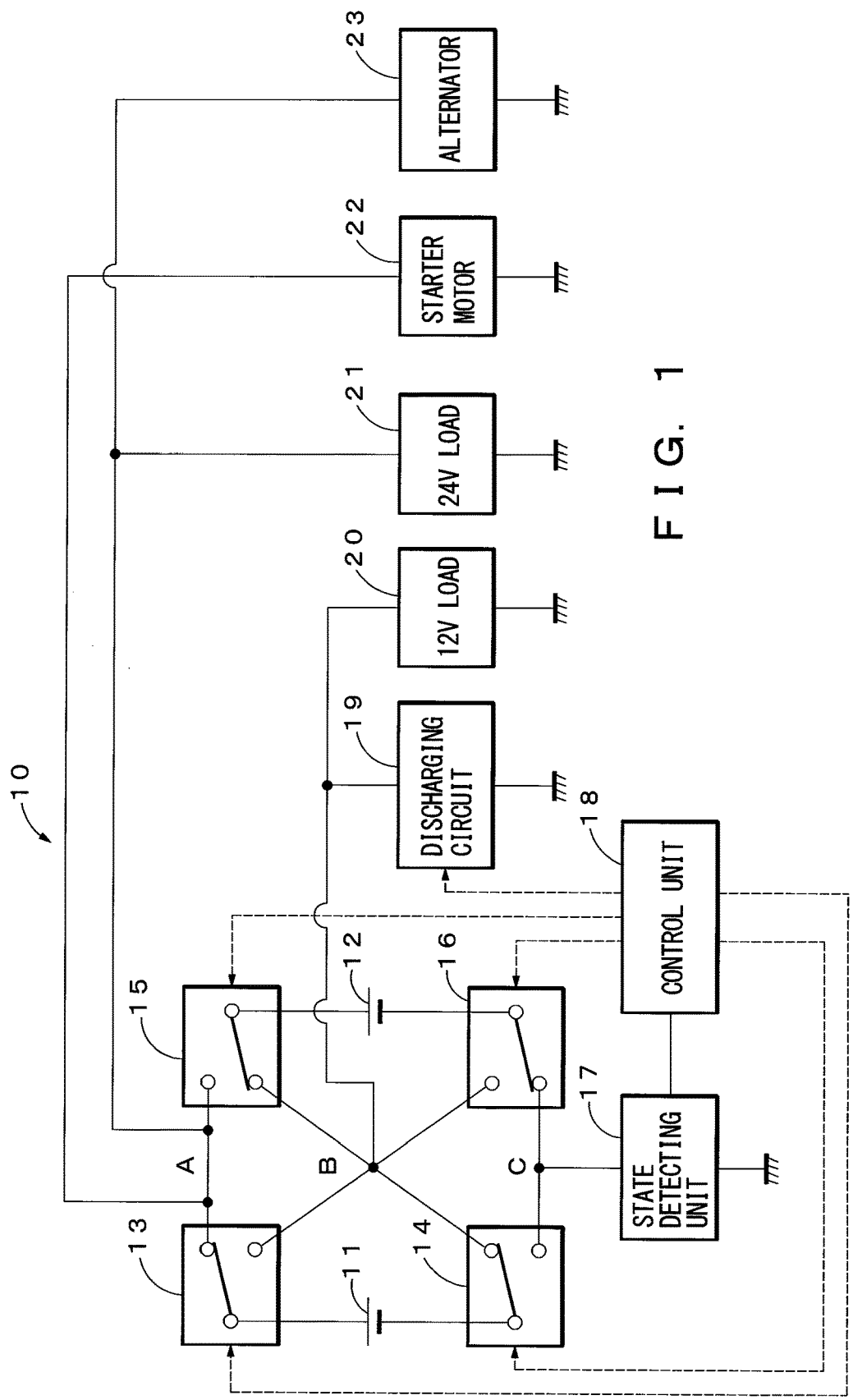
FIG. 1 is a diagram showing an exemplary configuration of a power supply apparatus according to an embodiment of the present disclosure.

FIG. 1 is a diagram illustrating an exemplary configuration of a power supply apparatus according to an embodiment of the present disclosure. As shown in FIG. 1, a power supply apparatus 10 includes secondary batteries 11 and 12, switches 13 to 16, a state detecting unit 17 and a control unit 18 as its main constituent elements, and a discharging circuit 19, a 12V-load 20, a 24V-load 21, a starter motor 22 and an alternator 23 are connected externally.

Each of the secondary batteries 11 and 12 is constituted by, for example, a secondary battery such as a lead-acid battery, a nickel-cadmium battery, a nickel metal hydride battery, a lithium-ion battery, and, for example, generates and outputs a direct current electric power of 12V.

The switches 13 to 16 are constituted by, for example, electromagnetic relays. The switch 13 has a common terminal connected to a positive pole of the secondary battery 11, a selective terminal connected to a connection point A, and another selective terminal connected to a connection point B. The switch 13 is controlled by the control unit 18 and connects the positive pole of the secondary battery 11 either to the connection point A or to the connection point B. The switch 14 has a common terminal connected to a negative pole of the secondary battery 11, a selective terminal connected to the connection point B, and another selective terminal connected to a connection point C. The switch 14 is controlled by the control unit 18 and connects the negative pole of the secondary battery 11 either to the connection point B or to the connection point C.

The switch 15 has a common terminal connected to a positive pole of the secondary battery 12, a selective terminal connected to the connection point A, and another selective terminal connected to the connection point B. The switch 15 is controlled by the control unit 18 and connects the positive pole of the secondary battery 12 either to the connection point A or to the connection point B. The switch 16 has a common terminal connected to a negative pole of the secondary battery 12, a selective terminal connected to the connection point B, and another selective terminal connected to the connection point C. The switch 16 is controlled by the control unit 18 and connects the negative pole of the secondary battery 12 either to the connection point B or to the connection point C.

The state detecting unit 17 detects states of the secondary batteries 11 and 12 and notifies the control unit 18. More specifically, the state detecting unit 17 detects a current, a voltage and a temperature of the secondary batteries 11 and 12, and notifies the control unit 18.

The control unit 18 is constituted by, for example, a CPU (Central Processing Unit), a ROM (Read Only Memory), a RAM (Random Access Memory), or the like, and the switches 13 to 16 and the discharging circuit 19, etc., are controlled based on the states of the secondary batteries 11 and 12 supplied from the state detecting unit 17. Note that in FIG. 1, each broken line connected from the control unit 18 to each part indicates a control line.

In response to the control of the control unit 18, the discharging circuit 19 periodically discharges electricity from the secondary battery connected to the connection point B. By detecting a current, a voltage, and an internal resistance at this instant, a charging rate SOC (State of Charge) or a degradation state SOH (State of Health) are measured.

The 12V-load 20 is, for example, a car audio equipment, a car navigation device, a horn, etc., that is operated by a voltage of 12V applied to the connection point B. The 24V-load 21 is, for example, an ABS (Anti Brake System), a TCU (Transmission Control Unit), etc., that operates with a voltage of 24V applied to the connection point A.

The starter motor 22 is constituted by a direct-current motor and starts up an engine, not shown, by supplying a direct current power of 24V. The alternator 23 is rotationally driven by an engine, not shown, and produces a direct current power of 24V and charges the secondary batteries 11 and 12.

(B) Description of Operation according to the Embodiment

An operation of the present embodiment will now be described. FIG. 2 is a flow chart for explaining a process flow executed in the present embodiment. When the process shown in FIG. 2 is started, the following steps are performed.

In step S10, the control unit 18 determines whether or not an ignition key, not shown, has been operated to bring an ignition switch into an ignition ON state. If it is determined to be in an ignition ON state (step S10: Yes), the process proceeds to step S11, and if not (step S10: No), the process is terminated. Specifically, in a case where a driver has brought an ignition switch into an ignition ON state to start up the engine of the vehicle, the process proceeds to step S11.

In step S11, the control unit 18 controls the switches 13 to 16 to select one of the secondary batteries 11 and 12 as an object to be measured. FIG. 3A shows a state in which, by the switches 13 to 16, the secondary battery 12 has been selected as an object to be measured, and FIG. 3B shows a state in which the secondary battery 11 has been selected as an object to be measured. In the state shown in FIG. 3A, since each of the switches 13 and 14 has selected a selective terminal on an upper side in the diagram and each of the switches 15 and 16 has selected a selective terminal on a lower side in the diagram, the positive pole of the secondary battery 12 is connected to the discharging circuit 19 and the negative pole is grounded via the state detecting unit 17. In the state shown FIG. 3B, since each of the switches 13 and 14 has selected a selective terminal on a lower side in the diagram and each of the switches 15 and 16 has selected a selective terminal on an upper side in the diagram, the positive pole of the secondary battery 11 is connected to the discharging circuit 19 and the negative pole is grounded via the state detecting unit 17.

Figure 4A:
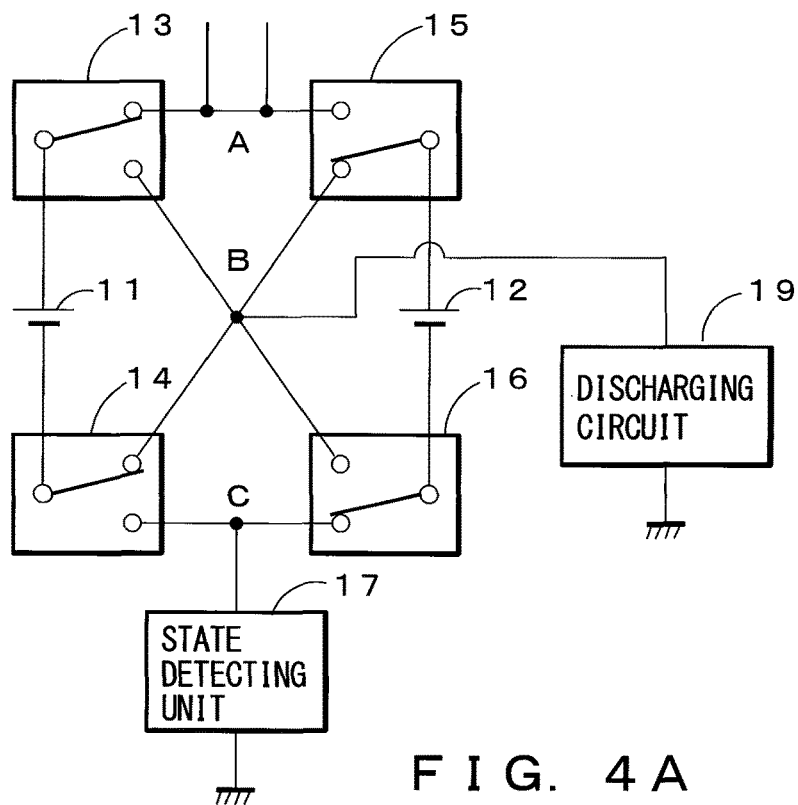
FIGS. 4A and 4B are diagrams showing a change in a connected state at the time of measurement in the embodiment shown in FIG. 1.
Figure 4B:
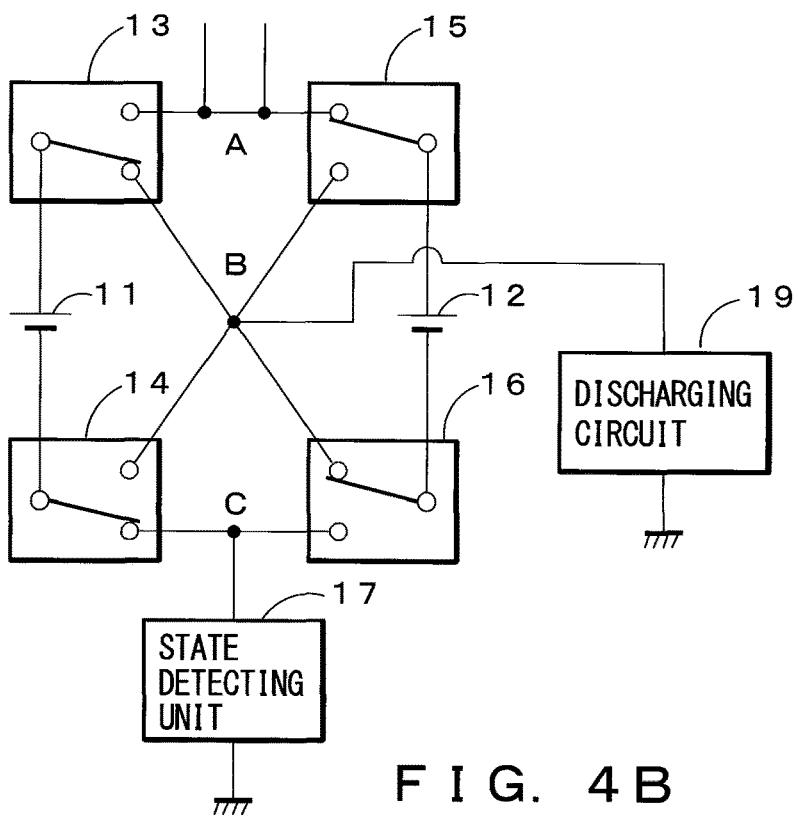

In step S12, the control unit 18 measures a charging rate SOC1 and a state of degradation SOH1 of the secondary battery selected in step S11. Specifically, the control unit 18 controls the discharging circuit 19 to obtain a current value and a voltage value from the state detecting unit 17 for a case where the selected secondary battery is discharged with a constant current, and retrieves an SOC corresponding to the obtained current value and the obtained voltage value from, for example, a table, and defines the retrieved SOC as SOC1. At this time, correction by temperature obtained from the state detecting unit 17 and correction by degradation based on SOH1 described below are performed. Further, the control unit 18 also controls the discharging circuit 19, causes the selected secondary battery to be discharged at a predetermined frequency, obtains an internal resistance from changes in voltage and current at that time and obtains SOH1 from the obtained internal resistance. The frequency of the discharge used for measurement can be, for example, chosen appropriately in the range of several tens of Hz to several kHz. FIG. 4A shows a state in which the secondary battery 12 is measured and FIG. 4B shows a state in which the secondary battery 11 is measured. In FIG. 4A, the positive pole of the secondary battery 12 is connected to the discharging circuit 19 and the negative pole is grounded via the state detecting unit 17. In FIG. 4B, the positive pole of the secondary battery 11 is connected to the discharging circuit 19, and the negative pole is grounded via the state detecting unit 17. In such a state, SOC1, SOH1, SOC2 and SOH2 of the secondary batteries 11 and 12 are measured.

In step S13, based on information from the state detecting unit 17, the control unit 18 determines whether or not the current flowing from the secondary battery selected in step S11 to the ground has a current value lower than a predetermined current value. If it is lower than the predetermined current value, the process proceeds to step S14 (step S13: Yes) and if not, a similar process is repeated (step S13: No).

In step S14, the control unit 18 controls the switches 13 to 16, and selects the other one of the secondary batteries 11 and 12, which was not selected in step S11, as an object to be measured. For example, in a case where the secondary battery 11 has been selected in step S11 as an object to be measured (in the case of FIG. 3B), the secondary battery 12 is selected in step S14 as an object to be measured (brought to FIG. 3A). The connections are switched over after having determined whether or not it is less than the predetermined current value in step S13. One of the reasons for this is to prevent the apparatus from being overloaded by a high voltage which may be generated by self-induction due to the switching, which may be caused when the switches 13 to 16 are switched over while a big current having a current value greater than or equal to a predetermined current value is flowing and in a case where a 12V-load 20 or a 24V-load 21 includes an inductive load. Another reason is to prevent the degradation of the contacts of the switches 13 to 16 caused by the switching while a relatively large current is flowing. The predetermined current value can be appropriately set by an allowable current value or the like of the switches.

In step S15, the control unit 18 measures SOC2 and SOH2 of the other secondary battery selected in step S14. The measuring process is similar to that of step S12.

In step S16, SOC1 of one of the secondary batteries measured in step S12 is compared with SOC2 of the other of the secondary batteries measured in step S15. If SOC1>SOC2 (step S16: Yes), the process proceeds to step S17, and if not (step S16: No), the process proceeds to step S18. For example, in a case where SOC1>SOC2 is satisfied, where SOC1 is the charging rate of the secondary battery 11 and SOC2 is a charging rate of the secondary battery 12, the process proceeds to step S17.

In step S17, the control unit 18 controls the switches 13 to 16, and sets one of the secondary batteries to a low-voltage side. More specifically, in a case where the secondary battery 12 is selected as one of the secondary batteries, SOC1 represents a measured value for the secondary battery 12 and SOC2 represents a measured value for the secondary battery 11. When SOC1>SOC2 is satisfied, i.e., when the secondary battery 12 has a higher charging rate than that of the secondary battery 11, the secondary battery 12 is set to a low-voltage side, and comes to a connected state shown in FIG. 3A. As a result, the 24V-load 21 and the starter motor 22 are supplied with an electric power from both of the secondary batteries 11 and 12, and the 12V-load 20 is supplied with an electric power from the secondary battery 12 having a higher charging rate.

In step S18, the control unit 18 controls the switches 13 to 16, and the other secondary battery is set at the low-voltage side. More specifically, when the secondary battery 12 is selected as one of the secondary batteries, SOC1 becomes a measured value of the secondary battery 12 and SOC2 becomes a measured value of the secondary battery 11. In a case where SOC1<SOC2 is satisfied, i.e., when the secondary battery 11 has a charging rate higher than that of the secondary battery 12, the secondary battery 11 is set at the low-voltage side, and comes to a connected state shown in FIG. 3B. As a result, the 24V-load 21 is supplied with an electric power from both the secondary batteries 11 and 12, and the 12V-load 20 is supplied with an electric power from the secondary battery 11 having a higher charging rate.

In the case of SOC1=SOC2, for example, it is possible to select one of them at random or compare SOH1 with SOH2, and to set the secondary battery in which the degradation state has not progressed (one with a greater SOH value) to the low-voltage side.

In step S19, the control unit 18 determines whether or not SOH1 of one of the secondary batteries is less than a predetermined threshold Th. If SOH1 is less than the threshold Th (step S19: Yes), the process proceeds to step S20, and if not (step S19: No), the process proceeds to step S21. Specifically, if SOH1 is less than a predetermined threshold Th as compared to SOH of a new secondary battery, the process proceeds to step S20, and if not, the process proceeds to step S21. The predetermined threshold can be appropriately set depending on a property or the like of the secondary battery to be used, and when a lead battery is used, it can be set in the range of, for example, 30 to 60%.

In step S20, the control unit 18 presents a message for encouraging the replacement of one of the secondary batteries. Specifically, in step S19, when it is determined that SOH1 of one of the secondary batteries is less than 50% of the new product, for example, a message for encouraging the replacement of one of the secondary batteries is presented on a display unit, not shown.

In step S21, the control unit 18 determines whether or not SOH2 of the other secondary battery is less than the predetermined threshold Th. If it is less than the threshold Th, the process proceeds to step S22 (step S21: Yes), and if not (step S21: No), the process terminates. Details of this process are similar to the case of step S19.

In step S22, the control unit 18 presents a message for encouraging the replacement of the other secondary battery. Details of this process are similar to the case of step S20.

According to the aforementioned process, when a driver has operated an ignition key to start up the engine of the vehicle and an ignition switch is brought into an ignition ON state, the secondary batteries 11 and 12 are sequentially selected and the respective SOC and SOH are measured. Then, since the secondary battery having a greater SOC is selected and connected to the low-voltage side, the 12V-load 20 is supplied with an electric power from the secondary battery having a greater SOC. Thereby, an unbalance between the charging rates of the secondary batteries is corrected. When the SOHs of the secondary batteries 11 and 12 have become less than the predetermined threshold Th, a message for encouraging the replacement is presented.

Figure 5:
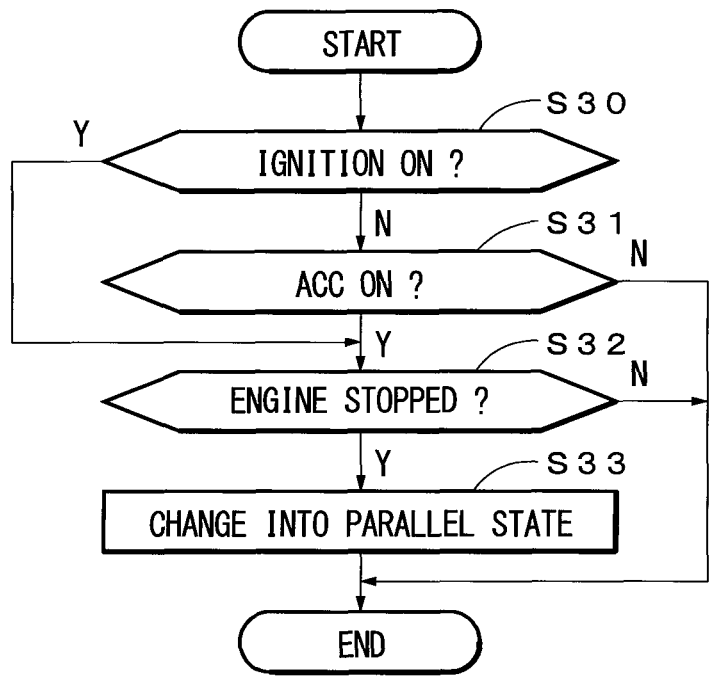
FIG. 5 is a flow chart for explaining a process flow executed in an embodiment shown in FIG. 1.

Referring now to FIG. 5, a case in which the secondary batteries 11 and 12 are connected in parallel and an electric power is supplied to the 12V-load 20 will be described. When a flow chart shown in FIG. 5 is started, the following steps are performed.

In step S30, the control unit 18 determines whether or not an ignition key, not shown, has been operated and an ignition switch has come to an ignition ON state. If is determined to be in an ignition ON state (step S30: Yes), the process proceeds to step S32, and if not (step S30: No), the process proceeds to step S31.

In step S31, the control unit 18 determines whether or not an ignition key, not shown, has been operated and it has come to an ACC (Accessory) ON state. If it is determined to be in an ON state (step S31: Yes), the process proceeds to step S32, and if not (step S31: No), the process terminates.

In step S32, the control unit 18 determines whether or not the engine is stopped. If the engine is stopped (step S32: Yes), the process proceeds to step S33, and if not (step S32: No), the process is terminated. For example, when it is brought to an ignition ON state or an ACC ON state while the engine is being stopped (when power is supplied to the 12V-load 20), the process proceeds to step S33, and if not (e.g., when the engine is started up), the process is terminated.

Figure 6:
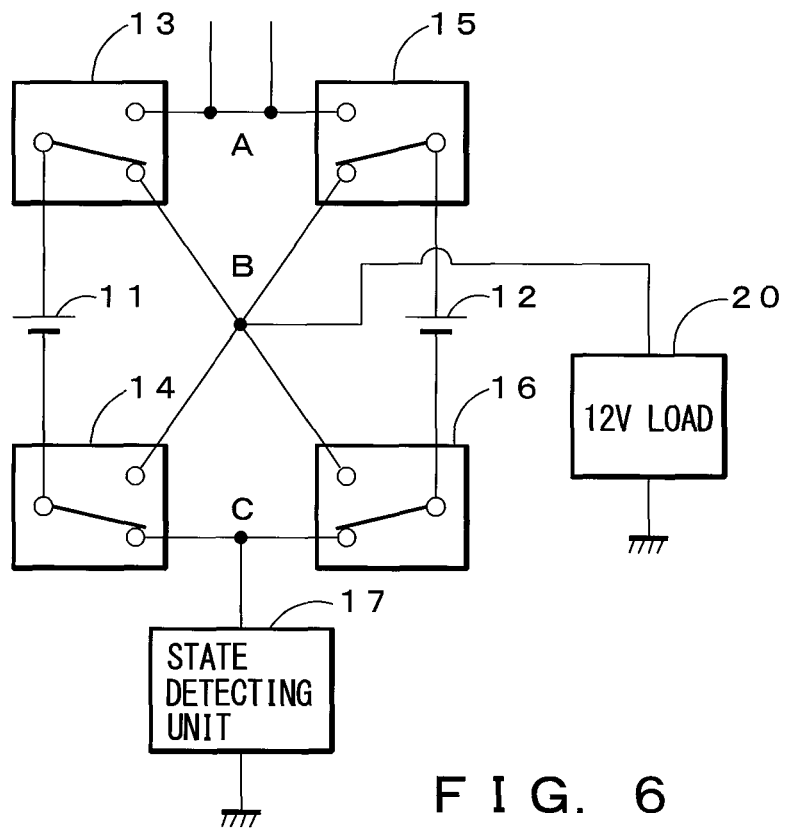
FIG. 6 is a diagram showing a connected state when the flow chart shown in FIG. 5 is executed.

In step S33, the control unit 18 controls the switches 13 to 16, and as shown in FIG. 6, the secondary batteries 11 and 12 are brought to a state where they are connected in parallel. That is, in the example of FIG. 6, all of the switches 13 to 16 are in a state where they are connected to the lower selective terminals and the positive poles of the secondary batteries 11 and 12 are both connected to the connection point B, and, the negative poles are both connected to the connection point C.

According to the aforementioned process, since an electric power is supplied to the 12V-load 20 with the secondary batteries 11 and 12 being connected in parallel, in a state where the engine is stopped and the charging is not performed, it is possible to prevent a decrease in a charging rate of one of the secondary batteries only.

As has been described above, in the present embodiment, an order of series connection of the secondary batteries 11 and 12 is changed by the switches 13 to 16 depending on the state of the secondary batteries 11 and 12. Therefore, an unbalance between the charging rates can be corrected by setting the secondary battery having a high charging rate to the low-voltage side and supplying an electric power to the 12V-load 20. In this manner, since concentration of a load on a single secondary battery can be avoided, the life of the battery can be lengthened.

Further, in the present embodiment, since SOC and SOH are measured while selecting the secondary batteries 11 and 12 one at a time using the switches 13 to 16, the measurement can be performed accurately. In this manner, since the states of the two secondary batteries 11 and 12 can be detected with a single state detecting unit 17 and thus it is not necessary to provide a state detecting unit for each of the secondary batteries, a cost reduction for the overall apparatus can be achieved.

Further, in the present embodiment, since the connections are changed by the switches, an unbalance between the charging rates of the secondary batteries can be corrected while reducing a power loss.

Further, in the present embodiment, SOH of the secondary batteries 11 and 12 are measured and when they are less than the predetermined threshold Th, a message for encouraging the replacement is presented. Accordingly, it is possible to know the time for replacement of the secondary batteries 11 and 12.

Further, in the present embodiment, in a state where the engine is stopped and the alternator 23 is not in operation, when it is brought to an ignition ON state or an ACC ON state, the secondary batteries 11 and 12 are brought into parallel connection and the 12V-load 20 is supplied with an electric power. Accordingly, it is possible to prevent only one of the secondary batteries from being discharged which may lead to an occurrence in an unbalance in the charging rate.

(C) Variant Embodiments

Each of the above embodiments is described by way of example and various variant embodiments other than the embodiments described above exist. For example, in the aforementioned embodiment, an example in which the secondary batteries 11 and 12 have a terminal voltage of 12V was described by way of example, but may also be of other voltages.

In the flow chart shown in FIG. 2, the state of the secondary batteries 11 and 12 are determined based on the charging rates SOC1 and SOC2, but the state of the secondary batteries 11 and 12 may also be determined based on the degradation states SOH1 and SOH2. Specifically, SOH1 and SOH2 may be compared and the secondary battery having a greater value may be connected to the low-voltage side. Alternatively, it is possible to perform the determination based on both of SOC1, SOC2 and SOH1, SOH2. Specifically, it can be determined based on magnitudes of products SOC1×SOH1 and SOC2×SOH2.

In the aforementioned embodiments, the charging rate SOC and the degradation state SOH are detected based on the changes in current and voltage at the time of discharge by the discharging circuit 19. However, the charging rate SOC and the degradation state SOH may be detected in accordance with a method other than this.

In the aforementioned embodiment, the flow chart shown in FIG. 2 is performed in such a manner that the process from step S11 onwards are performed in a case where the ignition key is brought to an ignition ON state, but the process from step S11 onwards may also be performed in a case where the engine is stopped. Alternatively, instead of immediately after the stoppage of the engine, the processes from step S11 onwards may be performed after a predetermined period of time has passed since the engine has been stopped and the secondary batteries 11 and 12 have come to a stable state. Also, SOC of the secondary battery on the ground side may be detected while running or idling, and in a case where the SOC has become a predetermined threshold or less, the order of series connection of the two secondary batteries may be changed at a predetermined timing (e.g., after the engine has stopped or when the discharging and charging current has come to a predetermined threshold or below). Further, the timing of changing the order of series connection is not limited to after the stoppage of the engine, and the order may also be changed in a case where the charge/discharge current has become a predetermined threshold or below during the running or idling. Further, SOC or SOH that has been measured during the running, during the stoppage or during the idling may be presented to the user by being displayed on a display unit disposed on a front panel, etc.

Further, in the aforementioned embodiment, an electromagnetic relay is used as switch, but, for example, a semiconductor switch such as an FET (Field Effect Transistor) or an IGBT (Isolated Gate Bipolar Transistor) may also be used.

Figure 7:
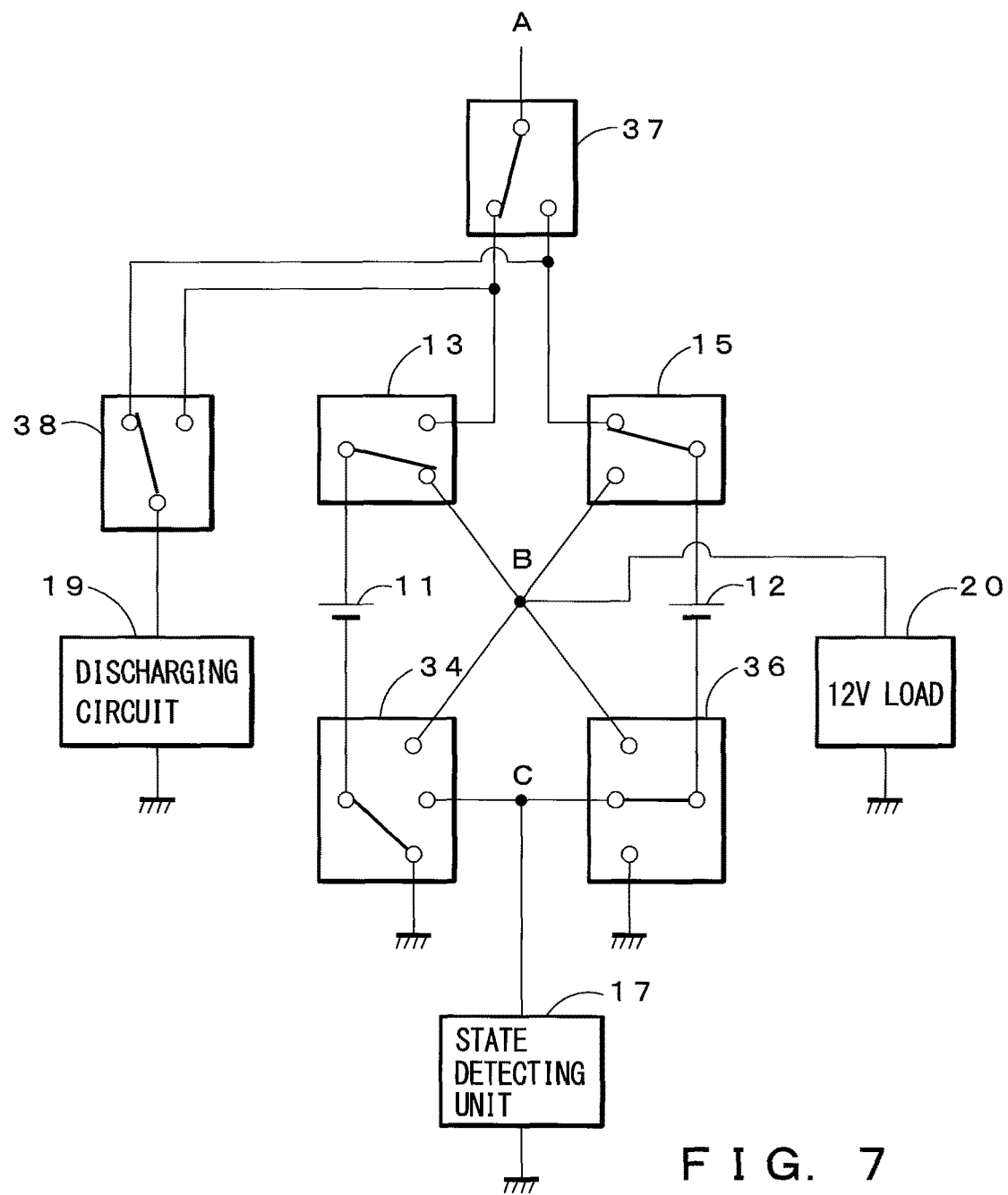
FIG. 7 is a diagram for explaining another embodiment of the present disclosure.

Further, in the aforementioned embodiment, the discharging circuit 19 and the 12V-load 20 are connected in parallel with the secondary battery to be measured. However, the discharging circuit 19 and the 12V-load 20 may be connected to another secondary battery. FIG. 7 is a diagram showing an embodiment in which the discharging circuit 19 and the 12V-load 20 are connected to another secondary battery. In the example of FIG. 7, as compared to the case of FIG. 1, the switches 14 and 16 are replaced with switches 34 and 36, and switches 37 and 38 are newly added. Here, the switch 34 has a single common terminal and three selective terminals. The common terminal is connected to the negative pole of the secondary battery 11, an upper selective terminal is connected to the connection point B, a middle selective terminal is connected to the connection point C, and a lower selective terminal is grounded. Similarly, the switch 36 also has a single common terminal and three selective terminals. The common terminal is connected to the negative pole of the secondary battery 12, an upper selective terminal is connected to the connection point B, a middle selective terminal is connected to the connection point C, and a lower selective terminal is grounded. The switch 37 has two selective terminals and a single common terminal. The switch 37 selects one of the selective terminals of either the switch 13 or 15 and connects it to the 24V-load 21, the starter motor 22 and the alternator 23. The switch 38 has two selective terminals and a single common terminal. The selective terminals are connected to the selective terminals of the switches 13 and 15, respectively, and the common terminal is connected to the discharging circuit 19.

An operation of the embodiment of FIG. 7 will now be described. In the state shown in FIG. 7, the switch 13 has selected a lower selective terminal, the switch 15 has selected an upper selective terminal, the switch 34 has selected a lower selective terminal, the switch 36 has selected a middle selective terminal, and the switches 37 and 38 have selected left selective terminals. In this case, the positive pole of the secondary battery 12 is connected to the discharging circuit 19 via the switches 15 and 38, and the negative pole is grounded via the state detecting unit 17. On the other hand, the positive pole of secondary battery 11 is connected to the 12V-load 20 via the switch 13, and the negative pole is grounded via the switch 34.

When the secondary battery 11 is selected as an object to be measured, it is to be brought to a state where the switch 13 has selected an upper selective terminal, the switch 15 has selected a lower selective terminal, the switch 34 has selected a middle selective terminal, the switch 36 selects a lower selective terminal, and the switches 37 and 38 have selected right selective terminals.

When the measurement is terminated, and, for example, when the secondary battery 11 is set to the low-voltage side, it is to be brought to a state where the switch 13 has selected a lower selective terminal, the switch 15 has selected an upper selective terminal, the switch 34 has selected a lower selective terminal, and switch 36 has selected an upper selective terminal, and the switches 37 and 38 have selected right selective terminals. On the other hand, in a case where the secondary battery 12 is set to the low-voltage side, it is to be brought to a state where the switch 13 has selected the upper selective terminal, the switch 15 has selected the lower selective terminal, the switch 34 has selected the upper a selective terminal, the switch 36 has selected the lower selective terminal, and the switches 37 and 38 have selected the left selective terminal.

When it is brought to a state where the switches 13 and 15 have selected the lower selective terminals and the switches 34 and 36 have selected the lower selective terminals, the secondary batteries 11 and 12 may be connected in parallel and an electric power may be supplied to 12V-load 20 as shown in FIG. 6.

As has been described above, in the embodiment shown in FIG. 7, since it is possible to connect only one of the secondary batteries to the discharging circuit 19, an influence of the 12V-load 20 is excluded and measurement can be performed accurately.

FIG. 8 is a diagram showing still another embodiment. In the example of this FIG. 8, as compared to the case of FIG. 1, switches 37, 38, 40 and 41 are newly added. Other configuration is similar to the case of FIG. 1. The switch 37 has two selective terminals and a single common terminal, selects one of the selective terminals of either the switch 13 or 15, and connects to the 24V-load 21, the starter motor 22 and the alternator 23 that are connected to the common terminal. The switch 38 has two selective terminals and a single common terminal. The selective terminals are connected to the selective terminals of the switches 13 and 15, respectively, and the common terminal is connected to the discharging circuit 19. The switch 40 has two selective terminals and a single common terminal. The selective terminals are connected to the lower selective terminal of the switches 14 and 16, respectively, and the common terminal is connected to the state detecting unit 17. The switch 41 has two selective terminals and a single common terminal. The selective terminals are connected to the lower selective terminals of the switches 14 and 16, respectively, and the common terminal is grounded.

In the example shown in FIG. 8, the switches 13 and 14 have selected the lower selective terminals, the switch 15 has selected the upper selective terminal, the switch 16 has selected the lower selective terminal, the switches 37 and 38 have selected the left selective terminals, and the switches 40 and 41 have selected the lower selective terminal. In such a connected state, the secondary battery 11 is connected to the 12V-load 20. Also, since the positive pole of the secondary battery 12 is connected to the discharging circuit 19 and the negative pole is connected to the state detecting unit 17, the secondary battery 12 can be measured independently.

On the other hand, in a state where the switch 13 has selected the upper selective terminal, the switch 14 has selected a lower selective terminal, the switches 15 and 16 have selected a lower selective terminal, the switches 37 and 38 have selected the right selective terminal, and the switches 40 and 41 have selected the upper selective terminal, the secondary battery 12 is connected to the 12V-load 20. Since the positive pole of the secondary battery 11 is connected to the discharging circuit 19 and the negative pole is connected to the state detecting unit 17, the secondary battery 11 can be measured independently.

When the measurement is terminated and the secondary battery 11 is to be set to the low-voltage side, the switches 13 and 14 are set to select the lower selective terminals, the switches 15 and 16 are set to select the upper selective terminals, the switches 37 and 38 are set to select the right selective terminals, and the switches 40 and 41 are set to select the lower selective terminals. On the other hand, when the secondary battery 12 is to be set to the low-voltage side, the switches 13 and 14 are set to select the upper selective terminals, the switches 15 and 16 are set to select the lower selective terminals, the switches 37 and 38 are set to select the left selective terminals, and the switches 40 and 41 are set to select the upper selective terminals.

As has been described above, in the embodiment shown in FIG. 8, since it is possible to connect only one of the secondary batteries to the discharging circuit 19, an influence of the 12V-load 20 can be excluded and measurement can be performed accurately.

Figure 9:
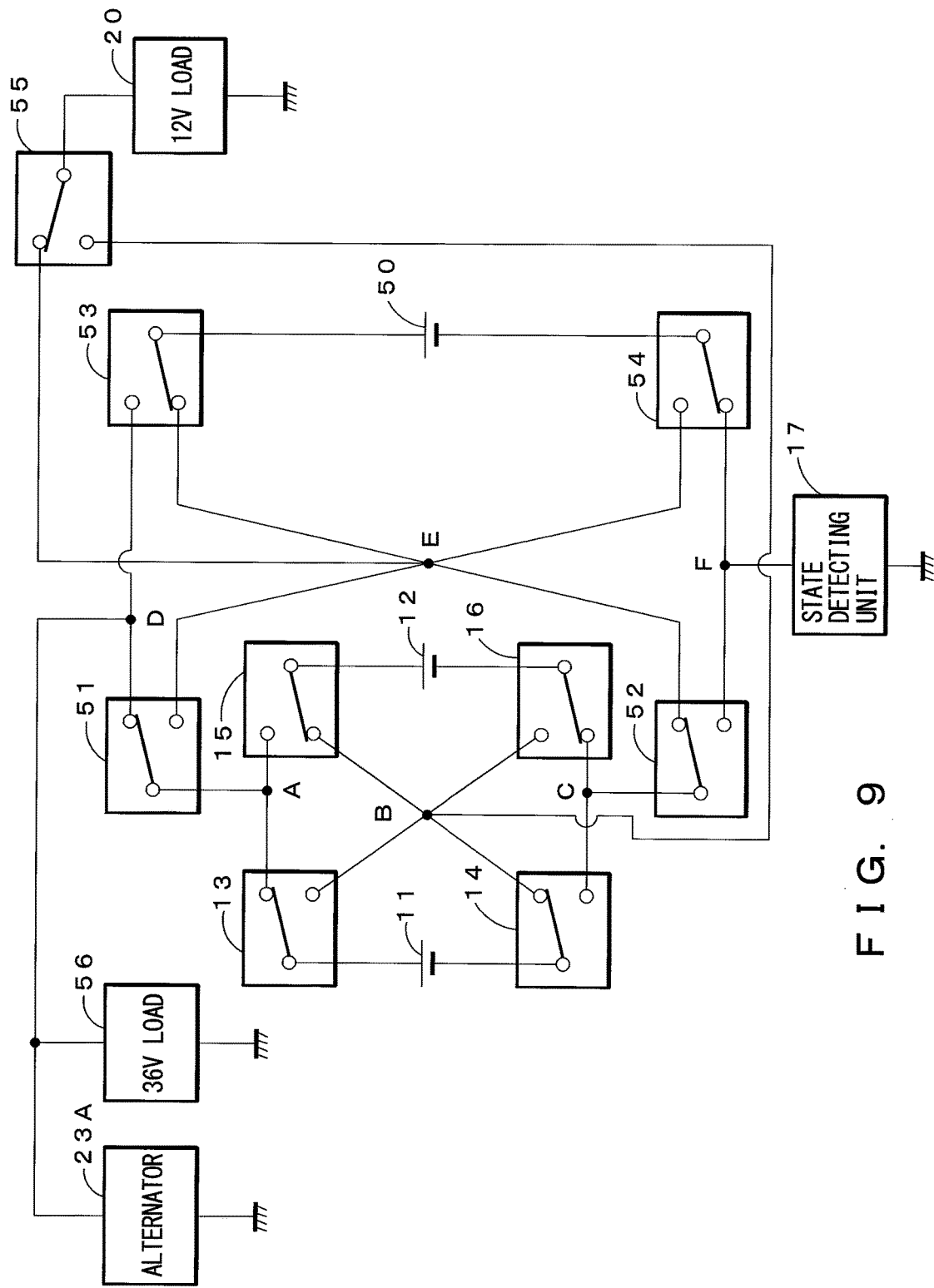
FIG. 9 is a diagram for explaining still another embodiment of the present disclosure.

In each of the aforementioned embodiments, a case in which two secondary batteries 11 and 12 are connected in series has been taken as an example, but three or more secondary batteries may be connected in series. FIG. 9 shows an embodiment for a case in which three secondary batteries 11, 12 and 50 are connected in series. In an example shown in this diagram, as compared to the case of FIG. 1, a secondary battery 50 and switches 51 to 55 are added, the 24V-load 21 is replaced with a 36V-load 56, and the alternator 23 is replaced with an alternator 23A.

Here, regarding the switch 51, a common terminal is connected to a connection point A, one of the selective terminals is connected to one of the selective terminals of other switches 52 to 54, and the other selective terminal is connected to the other selective terminal of the switch 53. Regarding the switch 52, a common terminal is connected to a connection point C, one of the selective terminals is connected to one of the selective terminals of other switches 51, 53 and 54, and the other selective terminal is connected to the other selective terminal of the switch 54. Regarding the switch 53, a common terminal is connected to a positive pole of secondary battery 50, one of the selective terminals is connected to one of the selective terminals of the other switches 51, 52 and 54, and the other selective terminal is connected to the other selective terminal of the switch 51. Regarding the switch 54, a common terminal is connected to a negative pole of the secondary battery 50, one of the selective terminals is connected to one of the selective terminals of the other switches 51, 52, and 53, and the other selective terminal is connected to the other selective terminals of the switch 52. Regarding the switch 55, a common terminal is connected to the 12V-load 20, one of the selective terminals is connected to a connection point E, and the other of the selective terminals is connected to the connection point B.

The 36V-load 56 is a load whereto a voltage of 36V is supplied. The alternator 23A outputs a voltage of 36V, and charges the secondary batteries 11, 12 and 50.

An operation of an embodiment shown in FIG. 9 will now be described. In the embodiment shown in FIG. 9, the operation of the switches 13 to 16 is similar to the case of FIG. 1, and an order of series connection of the secondary batteries 11 and 12 is changed by a connecting state of these switches 13 to 16. On the other hand, the switches 51 to 54 change an order of the series connection of the secondary batteries 11 and 12 and the secondary battery 50. Specifically, as shown in FIG. 9, when the switches 51 and 52 have selected upper selective terminals, the switches 53 and 54 have selected lower selective terminals, and the switch 55 has selected an upper selective terminal, the secondary battery 50 is grounded via the state detecting unit 17 and the secondary batteries 11 and 12 are connected in series in this order to a positive side of the secondary battery 50. At this time, the 12V-load 20 is supplied with an electric power from the secondary battery 50 and the 36V-load 56 is supplied with an electric power from the secondary batteries 11, 12 and 50. In such a state, similarly to the case of FIG. 1, the order of connection of the secondary batteries 11 and 12 can be changed by changing a connecting state of the switches 13 to 16.

On the other hand, when the switches 51 and 52 have selected lower selective terminals, the switches 53 and 54 have selected upper selective terminals, and the switch 55 has selected a lower selective terminal, the secondary battery 12 is grounded and the secondary batteries 11 and 50 are, in this order, connected to the positive side of the secondary battery 12. At this time, the 12V-load 20 is supplied with an electric power from the secondary battery 12 and the 36V-load 56 is supplied with an electric power from the secondary batteries 11, 12 and 50. In such a state, similarly to the case of FIG. 1, the order of connection of the secondary batteries 11 and 12 can be changed by changing the connecting state of the switches 13 to 16.

As has been described above, in the embodiment shown in FIG. 9, since the three secondary batteries 11, 12 and 50 can be connected in series and the order of series connection can be changed, the charge/discharge control of three secondary batteries can be performed easily.

Figure 10:
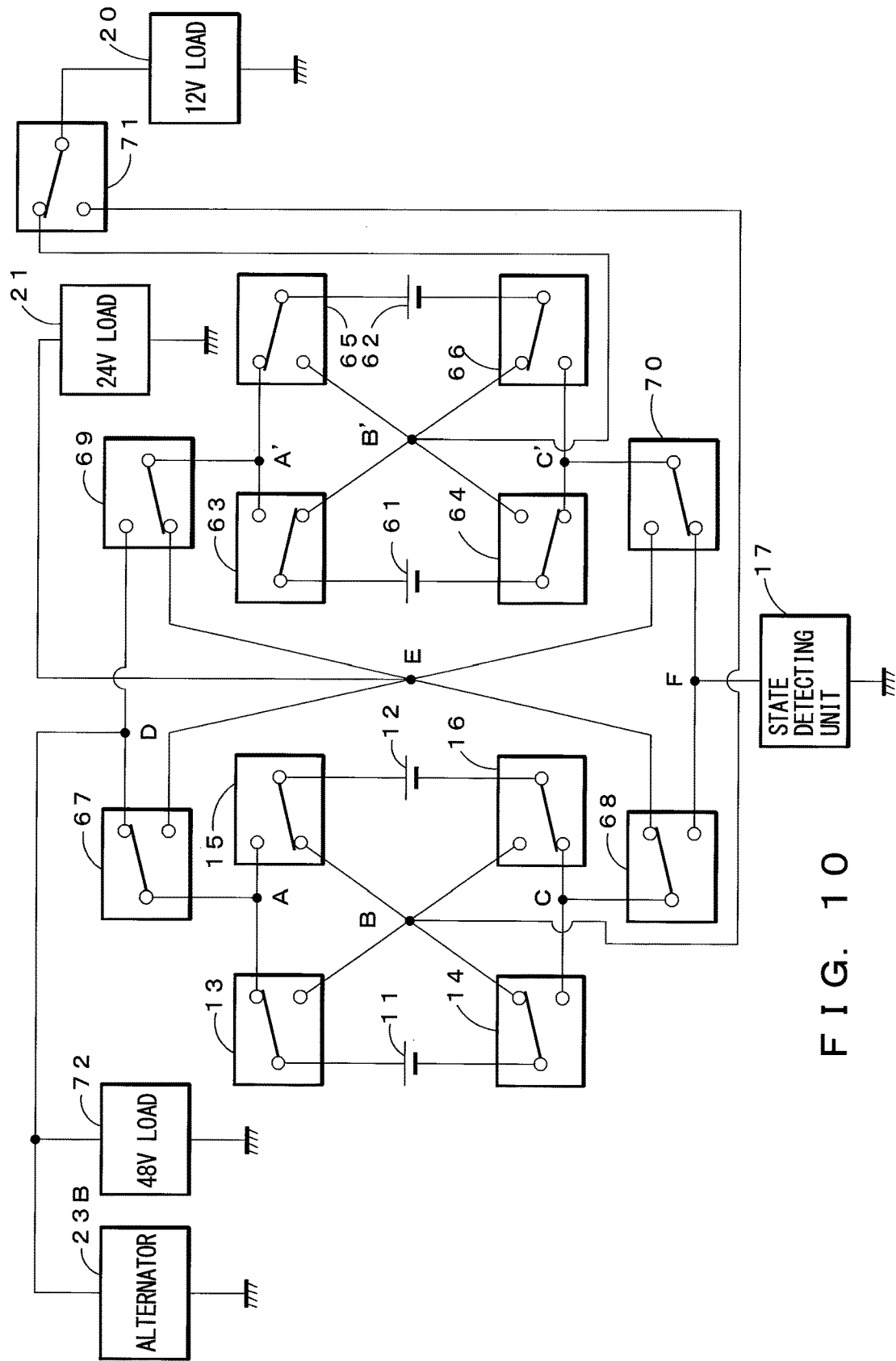
FIG. 10 is a diagram for explaining still another embodiment of the present disclosure.

Referring now to FIG. 10, a case in which four secondary batteries 11, 12, 61 and 62 are connected in series will be described. In the embodiment shown in FIG. 10, as compared to FIG. 1, secondary batteries 61 and 62, switches 63 to 71, and a 48V-load 72 are added, and the alternator 23 is replaced with an alternator 23B.

The secondary batteries 61 and 62 and the switches 63 to 66 are connected similarly to a manner in which the secondary batteries 11 and 12 and the switches 13 to 16 are connected. Regarding the switches 67 and 69, common terminals are connected to the connection points A and A', respectively. One of the selective terminals of the switches is connected with one of the selective terminals of the other switch and also connected to one of the selective terminals of the switches 68 and 70. The other selective terminal thereof is connected with the other selective terminal of the other switch and is also connected to the 48V-load 72 and the alternator 23B. Regarding the switches 68 and 70, common terminals are connected to the connection point C and C', respectively. One of the selective terminals thereof is connected with the one of the selective terminals of the other switch and also connected to one of the selective terminals of the switches 67 and 69. The other selective terminal thereof is connected with the other selective terminal of the other switch and also connected to the state detecting unit 17. Regarding the switch 71, a common terminal is connected to the 12V-load 20. One of the selective terminals is connected to the connection point B', and the other selective terminal is connected to the connection point B.

An operation of the embodiment of FIG. 10 will now be described. In the embodiment of FIG. 10, by changing the connection of switches 67 to 70, it is possible to select which of the secondary batteries 11 and 12 or the secondary batteries 61 and 62 are to be on the ground side. Specifically, as shown in FIG. 10, when the switches 67 and 68 have selected the upper selective terminals, the switches 69 and 70 have selected lower selective terminals, and the switch 71 has selected an upper selective terminal, the secondary batteries 61 and 62 are connected to the ground side. At this time, the 12V-load 20 is supplied with an electric power from the secondary battery 61, the 24V-load 21 is supplied with an electric power from the secondary batteries 61 and 62 connected in series, and the 48V-load 72 is supplied with an electric power from the secondary batteries 61, 62, 11 and 12 connected in series. On the other hand, when the switches 67 and 68 have selected the lower selective terminals, the switches 69 and 70 have selected the upper selective terminals, and the switch 71 has selected a lower selective terminal, the secondary batteries 11 and 12 are connected to the ground side. At this time, the 12V-load 20 is supplied with an electric power from the secondary battery 12, the 24V-load 21 is supplied with an electric power from the secondary batteries 11 and 12 connected in series, and the 48V-load 72 is supplied with an electric power from the secondary batteries 61, 62, 11 and 12 connected in series.

As has been described above, in the embodiment shown in FIG. 10, since the four secondary batteries 11, 12, 61 and 62 can be connected in series and the order of series connection can be changed, the charge/discharge management of the four secondary batteries can be performed in a facilitated manner.

What is claimed is:

1. A power supply apparatus comprising:
a plurality of secondary batteries connected in series;
a first output terminal that outputs a composite voltage of all of the plurality of secondary batteries, the first output terminal being configured to be connected to a first load;
a second output terminal that outputs an output of a part of the plurality of secondary batteries as a partial voltage, the second output terminal being configured to be connected to a second load, the first load and the second load being different from each other;
a detecting unit that detects states of the plurality of secondary batteries; and
a changing unit that changes an order of series connection of the plurality of secondary batteries based on a detection result of the detecting unit in such a manner that the composite voltage of a part of the plurality of secondary batteries that is a secondary battery in a relatively good state as well as a part of the plurality of secondary batteries that is a secondary battery other than the secondary battery in a relatively good state is supplied to the first load via the first output terminal, and the partial voltage is outputted from the part of the plurality of secondary batteries that is a secondary battery in a relatively good state and supplied to the second load via the second output terminal, so that power from the secondary battery in a relatively good state is supplied to both the first load and the second load.

2. The power supply apparatus according to claim 1, wherein
the power supply apparatus has two secondary batteries;
the power supply apparatus outputs a composite voltage of terminal voltages of the two secondary batteries and a terminal voltage of a secondary battery connected to a ground side as a partial voltage;
the detecting unit detects states of the two secondary batteries; and
the changing unit changes an order of the series connection in such a manner that a secondary battery that is in a relatively good state, which has been detected by the detecting unit, is connected to a ground side.

3. The power supply apparatus according to claim 2, wherein
the changing unit has four switches each having a single common terminal, a first selective terminal and a second selective terminal;
a positive pole and a negative pole of each of the two secondary batteries are connected to the respective common terminals of the four switches;
respective first selective terminals of the four switches are connected with one another, the respective first selective terminals being the second output terminal that outputs the partial voltage;
respective second selective terminals of two switches connected to the positive pole through the respective common terminals are connected with each other, the respective second selective terminals being the first output terminal that outputs the composite voltage;
respective second selective terminals of the two switches connected to the negative pole through the respective common terminals are connected with each other, the respective second selective terminals being a terminal that is connected to a ground; and
the order of series connection is changed by controlling a connecting state of the four switches.

4. The power supply apparatus according to claim 3, wherein the detecting unit is connected between the terminal that is connected to the ground and the ground.

5. The power supply apparatus according to claim 3, wherein a discharge unit that makes the secondary battery discharge when detecting the states of the secondary batteries is connected between the second output terminal that outputs the partial voltage and the ground.

6. The power supply apparatus according to claim 3, wherein the two secondary batteries are connected in parallel by the four switches and the partial voltage is supplied to a load.

7. The power supply apparatus according to claim 1, wherein, in detecting the states of the secondary battery by the detecting unit, the state of one of the secondary batteries is detected by the detecting unit and a terminal voltage of the other secondary battery is supplied to the load as a partial voltage.

8. The power supply apparatus according to claim 1, wherein
the power supply apparatus has three secondary batteries;
the power supply apparatus outputs a composite voltage of terminal voltages of the three secondary batteries and a terminal voltage of one of the secondary batteries connected to a ground side as a partial voltage;
the detecting unit detects the states of the three secondary batteries; and
the changing unit changes an order of series connection in such a manner that a secondary battery having a relatively good state, which has been detected by the detecting unit, is connected to a ground side.

9. The power supply apparatus according to claim 1, wherein
the power supply apparatus has four secondary batteries;
the power supply apparatus outputs a composite voltage of terminal voltages of the four secondary batteries and outputs a terminal voltage of one or two of the secondary batteries, which is connected to the ground side, as a partial voltage;
the detecting unit detects the states of the four secondary batteries; and
the changing unit changes an order of the series connection in such a manner that a secondary battery having a relatively good state, which has been detected by the detecting unit, is connected to a ground side.

10. The power supply apparatus according to claim 1, wherein, in the power supply apparatus, the detecting unit is a single detecting unit that detects the states of the plurality of secondary batteries is provided.

11. A power supplying method for supplying power from a power supplying apparatus having a plurality of secondary batteries connected in series, the power supply method comprising:
- outputting a composite voltage of all of the plurality of secondary batteries;
- outputting an output of a part of the plurality of secondary batteries as a partial voltage;
- detecting states of the plurality of secondary batteries; and
- changing an order of series connection of the plurality of secondary batteries based on detected states of the plurality of secondary batteries in such a manner that the composite voltage of a part of the plurality of secondary batteries that is a secondary battery in a relatively good state as well as a part of the plurality of secondary batteries that is a secondary battery other than the secondary battery in a relatively good state is supplied to a first load via a first output terminal of the power supplying apparatus, and the partial voltage is outputted from a secondary battery in a relatively good state and supplied to a second load via a second output terminal of the power supply apparatus, so that power from the secondary battery in a relatively good state is supplied to both the first load and the second load, the first load and the second load being different from each other.

12. The power supplying method according to claim 11, wherein,
in the power supplying method, a changing switch is switched only when a current detected in the detecting is less than or equal to a predetermined current.

13. The power supplying method according to claim 11, wherein the states of the plurality of secondary batteries are detected with a single detecting unit by operating switches connected to the plurality of secondary batteries.

* * * * *